United States Patent [19]
Horton et al.

[11] 4,428,246
[45] Jan. 31, 1984

[54] INFINITELY VARIABLE TRACTION ROLLER TRANSMISSION

[75] Inventors: Paul L. Horton, Austin, Tex.; Okoshi Hideo, Fujisawa, Japan

[73] Assignees: Excelermatic Inc., Austin, Tex.; Nippon Seiko; Kabushiki Kaisha, both of Tokyo, Japan

[21] Appl. No.: 336,281

[22] Filed: Dec. 31, 1981

[51] Int. Cl.³ .................. F16H 15/40; F16H 15/08
[52] U.S. Cl. .............................. 74/200; 74/190
[58] Field of Search ............... 74/190.5, 190, 200, 74/201, 199, 194, 206, 208

[56] References Cited

U.S. PATENT DOCUMENTS

| | | | |
|---|---|---|---|
| 2,748,614 | 6/1956 | Weisel | 74/190.5 |
| 2,850,910 | 9/1958 | Kraus | 74/190.5 |
| 2,850,911 | 9/1958 | Kraus | 74/190.5 |
| 3,008,337 | 11/1961 | Kraus | 74/200 |
| 3,087,348 | 4/1963 | Kraus | 74/200 |
| 3,159,042 | 12/1964 | Kraus | 74/200 |
| 3,163,050 | 12/1964 | Kraus | 74/200 |
| 3,163,051 | 12/1964 | Kraus | 74/200 |
| 3,184,983 | 5/1965 | Kraus | 74/200 |
| 3,261,219 | 7/1966 | Kraus | 74/200 |
| 3,299,744 | 1/1967 | Kraus | 74/721 |
| 3,570,317 | 3/1971 | Kraus | 74/206 |
| 3,933,054 | 1/1976 | Iseman | 74/200 |
| 4,086,820 | 5/1978 | Kraus et al. | 74/200 |
| 4,275,610 | 6/1981 | Kraus | 74/201 |

Primary Examiner—Lawrence J. Staab
Assistant Examiner—Michael David Bednarek
Attorney, Agent, or Firm—Klaus J. Bach

[57] ABSTRACT

An infinitely variable traction roller transmission which has traction rollers pivotally supported between toric discs mounted opposite each other on coaxial input and output shafts. The traction rollers are rotatably supported on a support block which is laterally movably supported on a pivotal traction roller support structure. The traction roller support block and pivotal support structure have cooperating bearing surfaces with rollers arranged therebetween to permit lateral movement of the support block. The bearing surfaces or bearing rollers are so formed that the support block is lifted off the pivotal support structure upon torque-induced lateral movement of the traction rollers in order to engage the traction rollers with the toric discs.

7 Claims, 8 Drawing Figures

INFINITELY VARIABLE TRACTION ROLLER TRANSMISSION

BACKGROUND OF THE INVENTION

The invention relates to an infinitely variable traction roller transmission having traction rollers pivotally supported between toric discs which are mounted opposite each other on input and output shafts. The traction rollers are so arranged that transmission of a torque forces them toward the axis of the toric discs for engagement with the discs.

In the design of toroidal infinitely variable traction roller transmissions, it is a major problem to provide for adequate but not excessive contact forces at any transmission ratio and under any circumstances such as rapid load changes or shock loadings from the input or output end of the transmission.

In many transmissions the contact forces are obtained by forcing the toric discs toward each other with a force which depends on the torque transmitted through the transmission. With this arrangement however it is difficult to provide adequate contact forces as the orientation of the traction roller with regard to the contact force direction is changing with any change in the transmission ratio.

It was already early realized that it would be advantageous to provide the contact forces by loading the traction rollers themselves such that the contact force direction is changing with any transmission ratio change so as to provide for proper traction roller contact forces in any pivotal position thereof.

U.S. Pat. No. 3,087,348 for example discloses a hydraulic piston arrangement disposed in the traction roller pivotal support to force the traction rollers into engagement with the toroidal discs. However such an arrangement requires high hydraulic pressures. It was also found that the reaction time was too long to prevent damage during shock loadings of the transmission. Another embodiment shows a roller-ramp structure, which arrangement however proved to be quite fragile. Both arrangements were relatively space-consuming such that rollers and thrust bearings could not be designed for adequate strength with the limited spaces usually available for the transmissions. U.S. Pat. No. 4,275,610 also employs a hydraulically operated loading arrangement for the traction roller in which the space problem is solved as the hydraulic loading structure is outside the traction rollers. This arrangement however is expensive and, while feasible for normal load applications, it is reacting only relatively slowly such that sudden load changes or shock loading may cause damages to the traction surfaces of the traction rollers and toroidal discs.

SUMMARY OF THE INVENTION

These disadvantages are overcome by the infinitely variable traction roller according to the present invention which has at least two traction rollers arranged in the toroidal cavity between two opposite toric discs which are mounted on input and output shafts. The traction rollers are rotatably supported by a pivotal support structure to permit changing the transmission ratio and they are further supported on the pivotal support structure in such a manner that they are movable along the pivotal support structure to be forced into firmer engagement with the toric discs, when a torque is transmitted through the transmission.

Preferably, the pivotal support structure has a curved traction roller support surface and each traction roller is mounted on a block which has bearing surfaces disposed opposite the roller support surfaces with bearing rollers disposed in the space between opposite bearing and roller support surfaces to permit, upon sideward movement of the traction rollers, to move them at the same time into firmer engagement with the toric discs.

Also, the support rollers may be sprag-type rollers which lift the traction rollers when they are moved sideways upon transmission of a torque.

DESCRIPTION OF THE PREFERRED EMBODIMENTS

Figure 2:
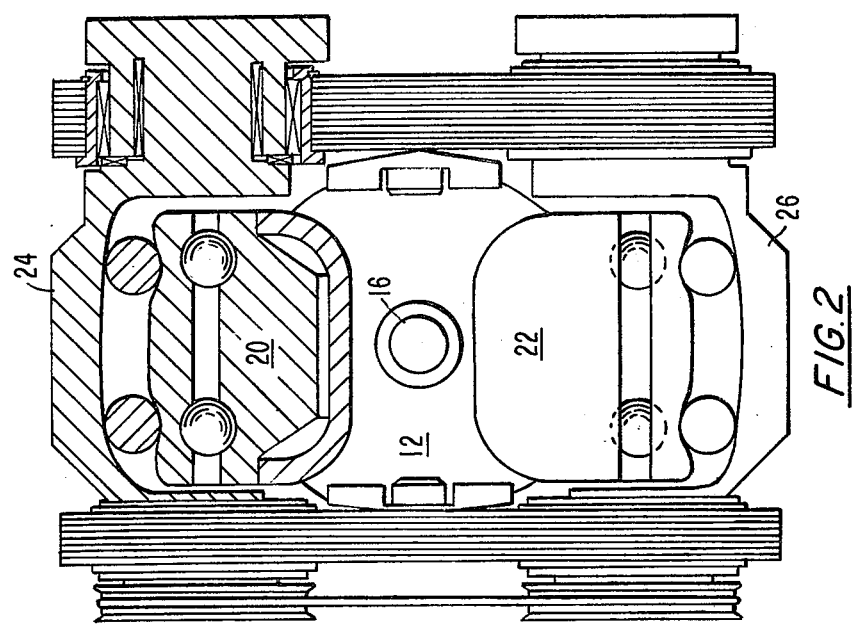
FIG. 2 shows the roller and roller support structure in a cross-sectional view taken along line II—II of FIG. 1.
Figure 1:
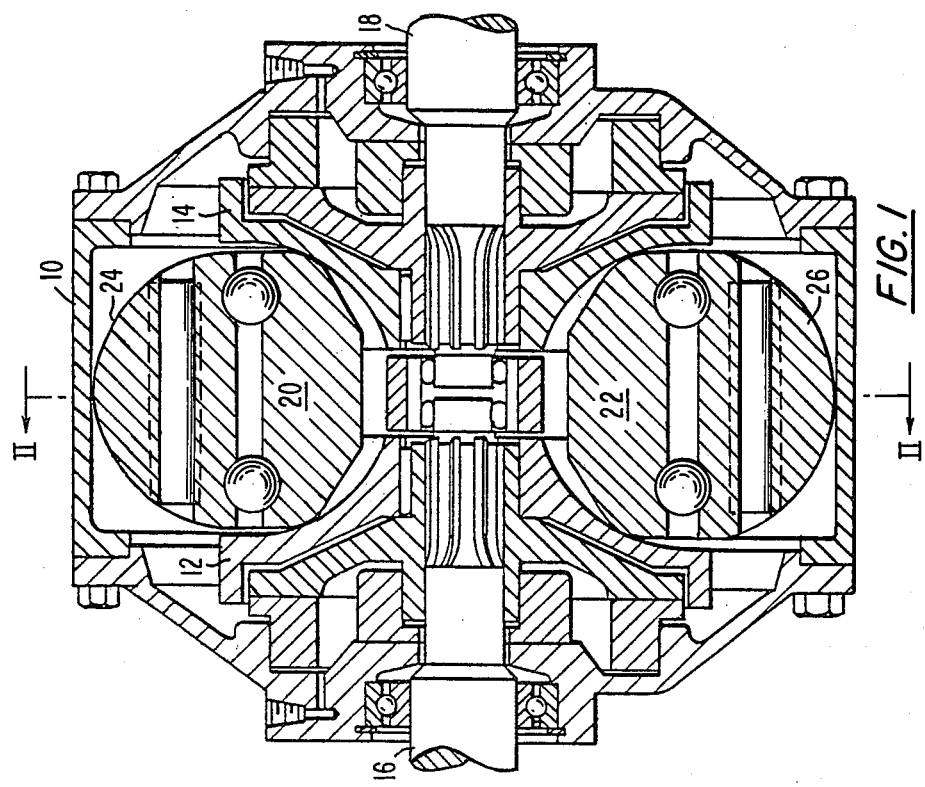
FIG. 1 shows a transmission embodying the present invention.

FIGS. 1 and 2 show a rotary traction roller transmission including in a housing 10 (FIG. 1) opposite toric discs 12, 14 mounted on input and output shafts 16, 18 which are rotatably supported in the housing 10. Traction rollers 20, 22 are disposed between, and in engagement with, the toric discs 12, 14 for the transmission of motion therebetween. The traction rollers 20, 22 are supported on pivotal support structures 24, 26 to permit a change of transmission ratio between input and output shafts 16, 18. Means are provided for forcing the traction rollers and toric discs into firm engagement with each other, which means are arranged under the traction rollers on the pivotal support structure thereof. Arrangements of this general type are described in detail in U.S. Pat. Nos. 3,810,398 and 4,275,610 to which reference is made for explanation of the details.

Figure 3:
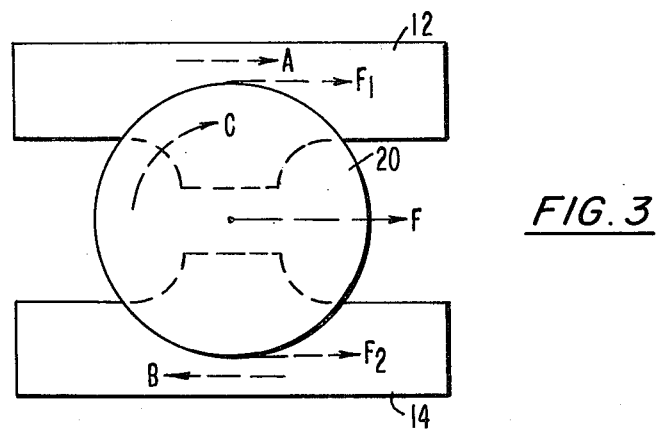
FIG. 3 is a graph showing the forces effective on the traction roller during operation.

FIG. 3 shows schematically a traction roller support structure in order to explain the forces acting on the traction rollers during operation of the transmission. Assuming that toric disc 12 is the driving disc rotating in the direction A and toric disc 14 is the driven disc rotating in the opposite direction B, while the traction roller 20 in engagement with the two toric discs 12 and 14 rotates in the direction of arrow C, there is a force $F_1$ applied to the traction roller 20 by disc 12 and a force $F_2$ is applied to the traction roller 20 by disc 14. Combined, the forces $F_1$ and $F_2$ provide the force F acting on the traction roller 20 normal to its axis in a plane including the traction roller pivot structure axis. The force F which equals $F_1 + F_2$ is dependent on the torque transmitted by the traction roller.

Figure 4:
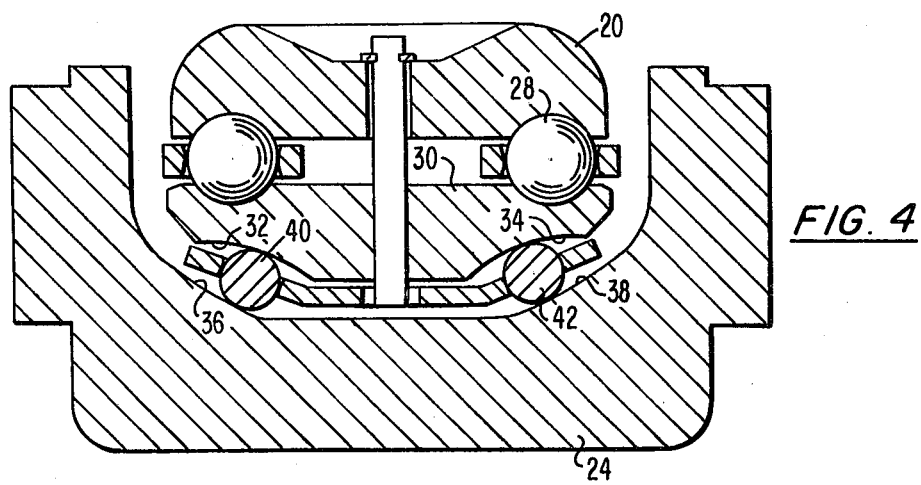
FIG. 4 shows an embodiment of a traction roller loading structure.

FIG. 4 shows the roller supporting pivotal structure 24 on which a traction roller 20 is rotatably supported by an axial thrust bearing 28 and a bearing support block 30. The bearing support block 30 has roller cam surfaces 32 and 34 arranged opposite cooperating cam surfaces 36 and 38 of the pivotal support structure 24, and rollers 40 and 42 are disposed in the space therebetween to permit movement of the traction rollers in axial direction of the pivotal support structure 24 when a torque is transmitted by the traction rollers. The cam surfaces 32, 34 and 36, 38 are, however, inclined and curved in such a manner that movement of the traction roller away from its center position will force the traction roller inwardly toward the axis of the transmission input and output shafts and, consequently into firm engagement with the toric discs 12 and 14. The cam surfaces 32 to 38 may be so formed that the axis of the roller 20 when moving on the support structure 24 always intersects the axis of the toric discs. Then, no precess movement will take place so that engaging motion of the traction rollers 20 will not affect the transmission ratio. On the other hand, it may be desirable to generate some precess movement of the traction rollers when the rollers are moved into firmer engagement with the toric disc, that is when a larger torque is being transmitted. For this purpose the cam surfaces may have a slightly different curvature providing for some precess motion adapted to change the transmission ratio to somewhat greater speed reduction which instantly increases the torque at the transmission output shaft.

Figure 5:
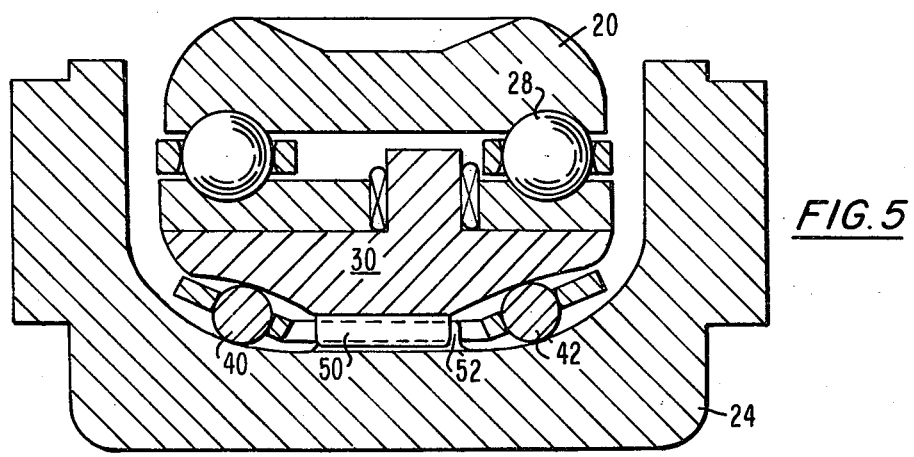
FIG. 5 shows another embodiment of a traction roller loading structure.

FIG. 5 shows a traction roller with a support structure considered adequate for use in connection with heavy duty transmissions for high loads. Here, the bearing support block 30 and the pivotal support structure 24 are provided with teeth 50, 52 which are in engagement with each other to retain the support block 30 in proper alignment with the roller support structure 24, but permit movement in axial direction of the roller support structure. Two rollers 40 are shown, but they are relatively long in order to provide sufficient roller support area. It is also possible to provide more than two rollers, for example four, two at each side of the center of the traction roller.

Figure 6:
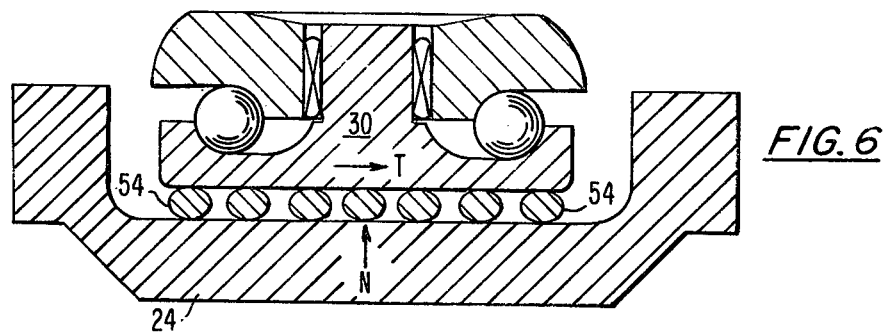
FIG. 6 shows a traction roller loading arrangement with sprag-type rollers.

FIG. 6 shows an embodiment where sprag-type rollers 54 are disposed between the traction roller support block 30 and the pivotal support structure 24. This arrangement is relatively simple as the support surfaces may be flat (as shown) or both curved in the same manner. The lifting action is provided by the oval cross-sectional shape of the rollers 54.

The sprag type rollers have symmetrical surfaces so that they operate in either rolling direction in the same manner. When being moved sideways they should provide as much lift as possible, but they should not slide. The climb angle $\alpha$ (FIG. 7) should be near maximum at any point on the surface of the sprag roller but less than the friction angle.

Figure 8:
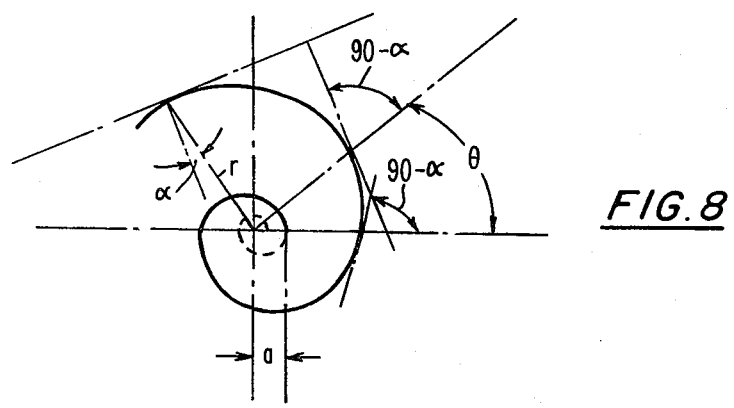

A surface contour resulting in a constant $\alpha$ is defined by a logrithmic sprial (FIG. 8) wherein:

$$r = a \, e^{(\tan\alpha) \, \theta \, rad} \tag{2}$$

$r = a$ when $\theta = 0$

If the sprag roller is composed of four identical portions of this spiral, $\Delta H$ is not a linear function of $\theta$. It is, however, a linear function of $b - b'$, or the relative rotation of the two disc faces, $\theta$.

$$\Delta H = (b - b')\tan\alpha = 2\pi R\theta \frac{\text{Deg}}{360} \tag{3}$$

Using equations (1) and (2):

$$\Delta H_{Max} = 2\left(a \, e^{\tan\alpha(\frac{90-\alpha}{360})2\pi} - a \, e^{\tan\alpha(0)}\right)$$

$$\Delta H_{Max} = 2a\left(e^{\tan\alpha(\frac{90-\alpha}{360})2\pi} - 1\right)$$

The required value for $\Delta H_{Max}$ would normally be set by calculating total deflections in a traction drive and applying a suitable factor of safety. A value of R would likely also be set by design considerations external to the loading device as would a value for the lead, L, usually expressed as mm rise per degree relative rotation in the loading device.

As an example, assuming a drive has been designed which requires a total lift of 2 mm, R of 17 mm, and a lead of 12 mm in 360 degrees.

$$\frac{L}{360} = \frac{H_{max}}{\theta_{max}} \qquad \frac{12}{360} = \frac{2 \text{ mm}}{60 \text{ deg}} \tag{5}$$

$$\theta_{max} = \frac{H_{max} \, 360}{L}$$

Figure 7:
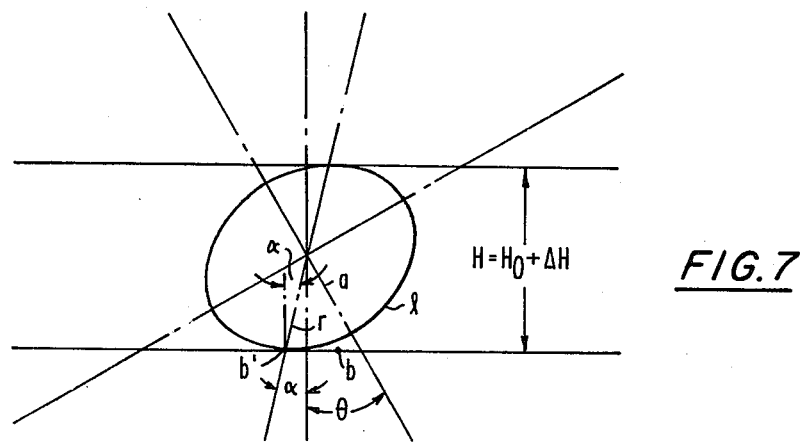
FIGS. 7 and 8 are sketches for explanation of the shape of sprag-type rollers.

A 60 degree rotation at a radius R of 17 mm will swing a total length, l in FIG. 7, of:

$$l = 2\pi R \left(\frac{d_{max}}{360}\right) \tag{6}$$

$$l = 2\pi 17 \left(\frac{60}{360}\right)$$

$$l = 17.8 \text{ mm}$$

The average diameter of the sprag roller is found as:

$$d_{ave} = \frac{2l}{\pi}\left(\frac{360}{360 - 4\alpha}\right) = \frac{4 \cdot R \cdot \theta_{max}}{360 - 4\alpha} = \frac{360 \cdot R \cdot \Delta H_{max}}{L(90 - \alpha)} \tag{7}$$

$$d_{ave} = 12.1 \text{ mm}$$

The minimum sprag diameter, 2a, is:

$$2a = d_{ave} - \frac{\Delta H_{max}}{2} \tag{8}$$

$$a = \frac{d_{ave}}{2} - \frac{\Delta H_{max}}{4}$$

$$a = \frac{180 \, R \, \Delta H_{max}}{L(90 - \alpha)} - \frac{\Delta H_{max}}{4}$$

$$a = 5.5 \text{ mm}$$

Equation (4) may now be written as:

$$\Delta H_{max} = \left[\frac{360 \cdot R \cdot \Delta H_{max}}{L(90 - \alpha)} - \frac{\Delta H_{max}}{2}\right] \times \left[e^{\tan\alpha(\frac{90-\alpha}{360})2\pi} - 1\right]$$

-continued $$1 = \left[\frac{360 R}{L(90-\alpha)} - \frac{1}{2}\right]\left[e^{\tan\alpha(\frac{90-\alpha}{360})2\pi} - 1\right]$$

In this case:
R=17
L=12
α may be found as:
α=6.43 degrees.

With such a transmission the forces with which the rollers and toric discs are engaged can be approximately the forces necessary for firm frictional engagement, they may be held to be large enough to prevent slippage and wear and small enough to avoid unnecessary wear in any pivot position of the pivotal support structures, that is at any transmission ratio.

What is claimed is:

1. An infinitely variable traction roller transmission comprising: coaxial input and output shafts; a toric disc supported by each of said shafts for rotation therewith, said toric discs being disposed opposite, and in spaced relationship from, each other so as to form a toroidal cavity therebetween; at least two motion transmitting traction rollers disposed in radial symmetry in said toroidal cavity between, and in engagement with, said toric discs so as to be capable of transmitting motion from one to the other of said toric discs; a pivotal support structure for each of said traction rollers; a support block rotatably supporting said traction roller at one side thereof and having at its opposite side a bearing surface supported on a cooperating bearing surface formed on said pivotal traction roller support structure with cam means provided at the interface of said cooperating bearing surfaces for supporting each support block and associated traction roller on its pivotal support structure laterally movably essentially in the direction of the pivot axis of said support structure, said cam means being adapted to convert lateral movement of said support blocks relative to said support structure into movement of said support block and traction roller toward said toric discs such that said traction roller is also moved into firmer engagement with said toric discs with a force corresponding to a torque transmitted by the traction roller between the toric discs.

2. A traction roller transmission as recited in claim 1, wherein rollers are disposed between said cooperating bearing surfaces so as to provide for lateral moveability of said support block on said pivotal support structure.

3. A traction roller transmission as recited in claim 2, wherein said cooperating bearing surfaces are cam surfaces so formed as to lift said support blocks off said pivotal support structures upon torque induced lateral movement of said traction roller and the associated support block for firm engagement of said traction rollers with said toric discs.

4. A traction roller transmission as recitted in claim 2, wherein said cooperating bearing surfaces are curved so as to provide a neutral central position for said bearing support block, said cooperating bearing surfaces being further curved to tilt and move the respective roller into firm engagement with the toric discs when, upon transmission of a torque, said support block is forced to move sidewardly on said traction roller support structure.

5. A traction roller transmission as recited in claim 2, wherein said rollers are sprag-type rollers which, upon torque-induced lateral movement of said support blocks on said pivotal support structures, will lift said support blocks off said pivotal support structure for firm engagement of said traction rollers with said toric discs.

6. A traction roller transmission as recited in claim 1, wherein said cooperating bearing surfaces are flat and said cam means are a plurality of parallel sprag-type rollers disposed therebetween.

7. A traction roller transmission as recited in claim 6, wherein said sprag-type rollers have symmetrical cross-sectional shapes so as to lift said support blocks in either direction of lateral movement thereof.

* * * * *